United States Patent [19]

Post

[11] Patent Number: 4,691,785
[45] Date of Patent: Sep. 8, 1987

[54] REVERSIBLE PLOW AND CARRIAGE

[75] Inventor: Charles R. Post, Midway City, Calif.

[73] Assignee: Post Brothers Construction Co., Orange, Calif.

[21] Appl. No.: 712,881

[22] Filed: Mar. 18, 1985

[51] Int. Cl.$^4$ .......................... A01B 63/16; A01B 3/30
[52] U.S. Cl. .................................... 172/212; 172/225; 172/400; 280/43.13
[58] Field of Search ............... 172/206, 207, 212, 224, 172/225-226, 677, 204, 209, 211, 227, 647, 611, 400, 401, 421; 280/43.13, 43.15, 43.16, 43.23

[56] References Cited

U.S. PATENT DOCUMENTS

| Re. 26,129 | 12/1966 | Pursche | 172/206 |
|---|---|---|---|
| 329,731 | 11/1885 | Gibbs | 172/421 X |
| 2,582,337 | 1/1952 | Kaltoft | 172/211 |
| 2,601,296 | 6/1952 | Johnson | 172/206 |
| 2,780,158 | 2/1957 | Pursche | 172/206 X |
| 2,943,688 | 7/1960 | Cox et al. | 172/212 |
| 2,960,170 | 11/1960 | Cantral | 172/611 X |
| 4,273,197 | 6/1981 | Hawes | 172/225 |
| 4,316,507 | 2/1982 | Lindqvist | 172/225 |
| 4,475,601 | 10/1984 | Harden et al. | 172/742 X |

FOREIGN PATENT DOCUMENTS

| 1110930 | 7/1961 | Fed. Rep. of Germany | 172/224 |
|---|---|---|---|
| 608130 | 9/1948 | United Kingdom | 172/209 |
| 953437 | 3/1964 | United Kingdom | 172/224 |

Primary Examiner—Richard T. Stouffer
Assistant Examiner—Terrence L. B. Brown
Attorney, Agent, or Firm—Plante Strauss Vanderburgh

[57] ABSTRACT

There is disclosed a carriage for an agricultural implement, particularly for a reversible plow, in which the wheels at each side of the carriage are mounted to the carriage with forks which are pivotally received on a main axle and which have lift arms interconnected to a lift assembly. The wheel lift assembly has lift levers fixedly secured at opposite ends of a lift shaft and these are connected to their respective lift arms on the wheel forks by lift links having adjustable pinned connections to the lift levers whereby the fulcrum of each lift lever can be changed by insertion of pins in preselected, aligned pairs of apertures between the link arm and lift lever. The fulcrum positions of the lift levers control the elevations of the wheels on the carriage. The lift assembly is also provided with a fulcrum selector which, when shifted sidewise on the frame, inserts pins into preselected, aligned pairs of apertures and retracts pins from other apertures, thereby reversing, from side-to-side, the elevations of the wheels. This carriage is disclosed in combination with a reversible plow having a plow bar supporting two plow assemblies which can be rotated through a 180-degree arc, to reverse, side-to-side, the position of the plow.

20 Claims, 14 Drawing Figures

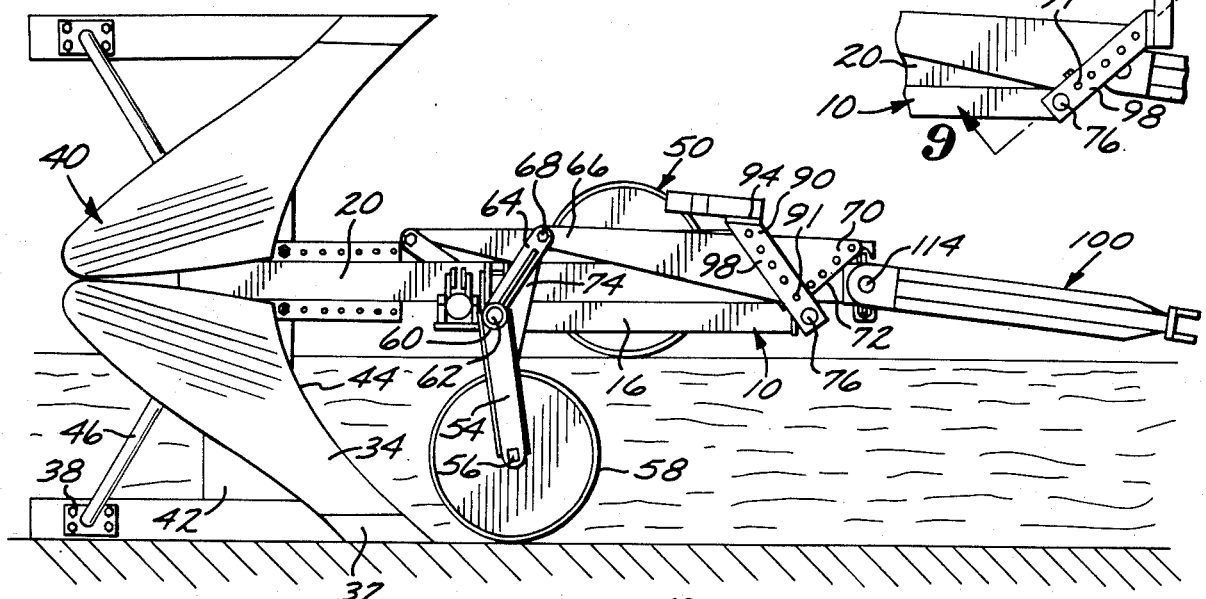

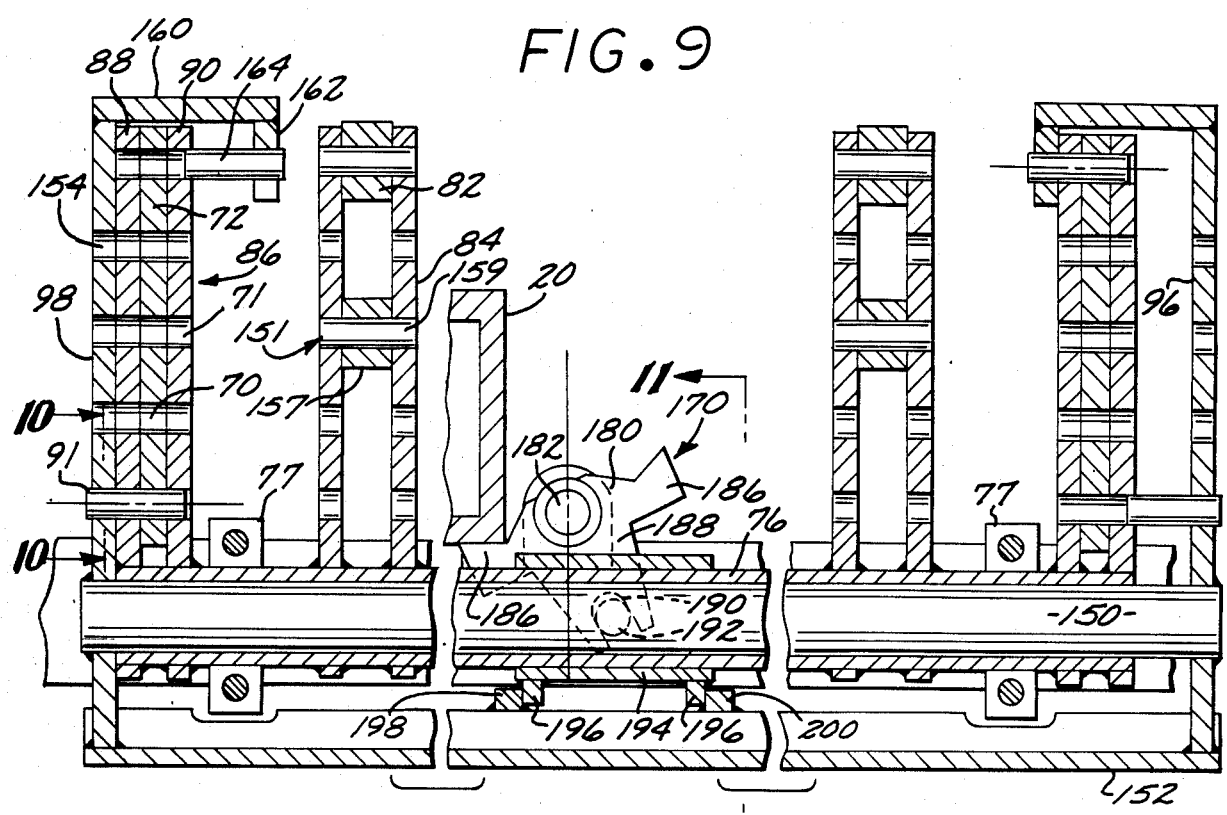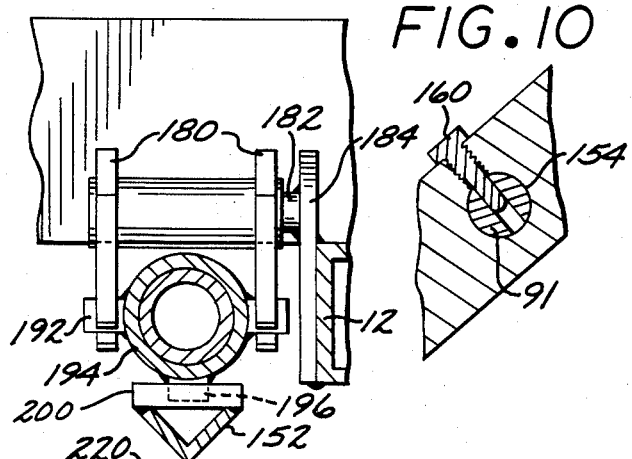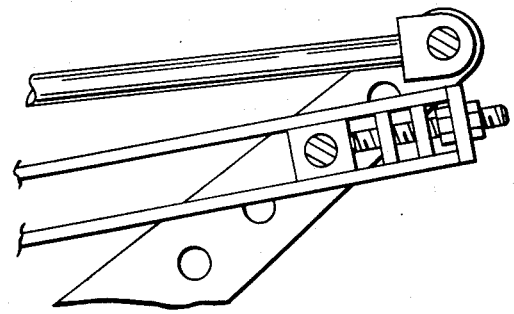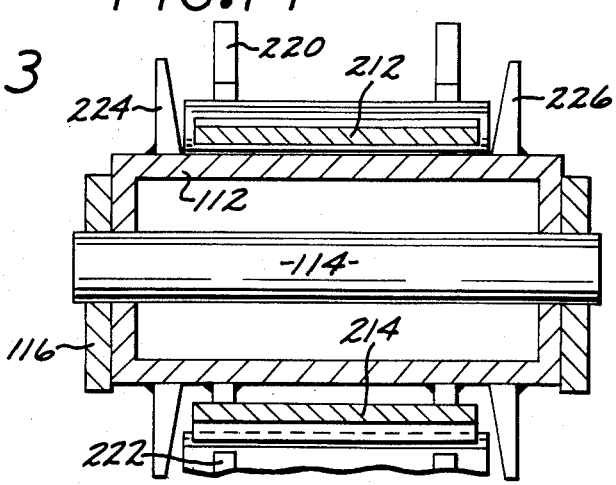

REVERSIBLE PLOW AND CARRIAGE

BACKGROUND OF THE INVENTION

1. Field of the Invention

This invention relates to a carriage for agricultural implements and, in particular, to a reversible plow for deep furrow plowing.

2. Brief Statement of the Prior Art

Deep furrow plows have been used for a number of decades, particularly in the Western United States, to break up hard pan and improve the irrigation of arid soils. These plows are used at depths up to six feet, and have varied in complexity from single plow assemblies of a single mouldboard, plowshare and landside to two plow assemblies, mounted inverted to each other on a single plow bar which can be rotated to reverse the plow position, side-to-side. The reversible plows have the ability to return down the furrow, thus permitting plowing a field with a single furrow, simply by reversing the plow position and returning down the furrow. This, of course, also requires wheel lift means to reverse the positions of the wheels at either side of the plow between furrow wheel and land wheel positions. Previous plows have required considerable manual adjustment of the wheel lift system to reverse the position of the wheels, and have thus lost much of the advantage of the reversible plow design.

BRIEF STATEMENT OF THE INVENTION

This invention comprises a carriage for agricultural implements, particularly reversible plows, in which the elevation of the wheels at either side of the carriage can be reversed, side-to-side, in a simple, direct manner. To this end, the wheels at each side of the carriage are mounted on shafts of wheel forks which are pivotally supported by the main axle and which have fork arms which are connected, with lift links, to lift levers of the wheel lift assembly. The wheel lift levers are fixedly secured to opposite ends of a wheel lift shaft that is mounted on the carriage frame and that can be rotated by a hydraulic lift assembly. Each lift lever has a plurality of spaced-apart apertures which align with a like plurality of spaced-apart apertures in the end of the lift links when the wheels are in their most elevated positions with the lift levers retracted to a "wheels-up" configuration. In this configuration, the operator can insert a pin in a selected pair of aligned apertures to select a fulcrum position for the lift lever, thus selecting the elevation of its respective wheel when the lift levers are extended to lower the wheels. In the preferred embodiment, a fulcrum selector is provided which comprises a selector bar mounted for sidewise shifting on the carriage that distally supports selector arms which, as the selector is shifted, side-to-side, retracts pins from pairs of aligned apertures, and inserts pins in different, preselected pairs of aligned apertures. The result is to reverse, side-to-side, the elevation of the wheels when the lift levers are extended. This carriage structure is combined with a longitudinal plow bar supporting, at its rear end, a pair of inverted plow assemblies. A hydraulic assembly is provided to effect rotation of the plow bar about an axis above the carriage frame, thereby reversing the plow position, side-to-side. Preferably, the plow bar is mechanically linked to the wheel lift selector bar whereby the rotation of the plow bar and reversal of the plows shifts the wheel lift selector and reverses the elevations of the wheels between furrow wheel and land wheel elevations. In the preferred embodiment, the aforementioned carriage is also provided with a hitch assembly which permits a slight downward, and greater upward flexing between the plow bar and hitch.

BRIEF DESCRIPTION OF THE DRAWINGS

The invention will be described with reference to the figures, of which:

FIG. 1 is an elevational view of the plow of the invention in one of its two plowing configurations;

FIG. 2 is a view of the forward end of the wheel lift assembly in the "wheels-up" configuration;

FIG. 3 is a plan view of the plow in the configuration of FIG. 1, with the upper plow assembly removed for clarity;

FIG. 4 is a view in the same sectional plane as FIG. 7, illustrating the position of the plow which is opposite that of FIG. 7;

FIG. 5 is a view along lines 5—5 of FIG. 4;

FIGS. 6 and 8 are views in the same sectional plane as for FIG. 7 and illustrating successive positions of the plow bar during its rotation between the positions of FIGS. 4 and 7;

FIG. 7 is a view along lines 7—7 of FIG. 3;

FIG. 9 is a view along lines 9—9 of FIG. 8;

FIG. 10 is a view along lines 10—10 of FIG. 9;

FIG. 11 is a view along lines 11—11 of FIG. 9;

FIG. 12 is a view along lines 12—12 of FIG. 3;

FIG. 13 is a view along lines 13—13 of FIG. 3; and

FIG. 14 is a view along lines 14—14 of FIG. 13.

DESCRIPTION OF THE PREFERRED EMBODIMENT

The invention is described with reference to the illustrated and preferred embodiment of a reversible, deep-furrow plow. It is understood, however, that the carriage of the invention is equally applicable to other embodiments, e.g., for shallow plows and for any other agricultural implement in which it is necessary or convenient to reverse the elevation, side-to-side, of the carriage wheels. Such other applications could include, for instance, a carriage for a mechanical grape or berry harvester adaptable for use on hillsides which are often too steep for use of mechanized harvesting equipment.

Referring now to FIGS. 1 and 3, the invention comprises a carriage, generally indicated at 10 which supports a plow bar 20. The carriage 10 is formed of square tubular frame members, which are shown in FIG. 3 as a front crossbar 12, a rear crossbar 14, and right and left longitudinal bars 16 and 18, respectively. Additional longitudinal bars are mounted, one at each side beside bars 16 and 18, within the frame. These are shown as bar 17 beside bar 16, and bar 19 beside bar 18, in FIG. 3. The plow bar 20 distally supports a plow assembly 30 and an inverted and reversed, like plow assembly 40. Each plow assembly includes a plowshare 32, mouldboard 34 and landside 36. The plow assemblies are conventional in construction with a gusset 42 which extends along the leading edge 44 of the mouldboard 34, and a plow brace 46 which extends between bracket 38 which is bolted to the landside 36 and an upper portion of the mouldboard 34.

The carriage supports right and left wheel assemblies 50 and 52. Each assembly comprises a wheel fork 54 distally supporting a wheel shaft 56 to receive a wheel 58, and at its opposite end, knuckle 60 which is pivotally received on the main axle 62 which is fixedly secured to, and extends laterally across the frame 10. A wheel fork arm 64 projects from knuckle 60 and terminates in pivotal connection to the end of lift link 66 by pin 68. Each fork arm 64 is reinforced by a triangular gusset 74. Each lift link 66 is generally triangular in shape (see FIG. 1) and has a row of spaced-apart apertures 70 at its forward end 72.

The carriage also supports a wheel lift assembly which is mounted to the carriage frame 10 with a lift shaft 76 that is rotatably mounted to the carriage frame by split half pillow blocks 78. The rear halves of the pillow blocks are fixedly secured to the forward ends of the longitudinal frame bars 16 and 18. A lift actuator is provided in the form of hydraulic or lift cylinders 80 (see FIG. 3), one each secured to the rear crossbar 14 at each side of the frame 10, and the piston shaft 82 of the cylinders is connected to actuator arms 84 which are fixedly secured to the lift shaft 76. The lift cylinders 80 are mounted above the inside longitudinal bars 17 and 19. A lift lever 86, which is formed by a pair of identical lift lever arms 88 and 90, is fixedly secured to each end of lift shaft 76, outboard of the pillow blocks 78. The lift lever arms 88 and 90 are spaced apart a slight distance and the forward ends 72 of the lift links 66 are received between each pair of lift lever arms. The lift lever arms 88 and 90 also have a plurality of spaced-apart apertures, which, when the lift assembly is in its retracted position, shown in FIG. 2, align with the plurality of apertures 70 in the forward ends 72 of the lift links 66. As described hereinafter in greater detail with reference to FIGS. 9–11, pins are inserted between preselected pairs of aligned apertures. These pins determine the fulcrum of each lift lever 86. As shown in FIG. 1, the right lift lever has a pin 91 inserted in the lowermost pair of apertures, preselecting this pair which positions its respective wheel 58 at its lowest, or furrow elevation. The insertion and retraction of fulcrum pins in the preselected pairs of aligned apertures is controlled with a fulcrum selector, which is generally indicated at 94 and which includes a pair of selector arms 96 and 98, one each at the opposite ends of the selector 94.

Plow bar 20 is mounted on the carriage frame 10 with hinge means permitting its pivotal movement through a 180 degree arc, to reverse its position between the right side plowing position shown in bold lines, and the left side plowing position shown in phantom lines in FIG. 3. The hinge means comprises a pair of hinges generally indicated at 22, one each centrally located on each of the front crossbar 12 and rear crossbar 14. Each hinge is formed with a pair of triangular hinge plates 24 which are received between upright hinge posts 26 that are fixedly secured to a respective frame crossbar. A hinge pin 28 completes the hinge assembly.

At its forward end, plow bar 20 is pivotally secured to the hitch 100, formed of a tubular hitch bar 102 and a upper and lower diagonal braces 106 and 107, which extend forwardly from opposite ends of hitch bracket 116. At its forward end, hitch bar 102 supports a swivel hitch 108, which is mounted on a trunion (not shown) that is received in the end of tubular hitch bar 102, thereby permitting rotation of the swivel hitch about the axis of hitch bar 102. The hitch bar 102 projects slightly laterally from hitch bracket 116 so that the swivel hitch 108 is laterally offset approximately 5 feet from the open furrow, shown by phantom line F—F' in FIG. 3. The plow bar is pivotally connected to the hitch bracket 116 of hitch 100 by forward bracket 110 which receives hitch pin 114, which is also received in aligned bores of hitch bracket 116. This structure is described in greater detail hereinafter with reference to FIGS. 13 and 14.

Referring now to FIGS. 4–8, the reversal of the position of the plow bar 20 will be described. FIG. 4 shows the plow bar 20 in the left side plowing position, resting on crossbar 14 of frame 10. The hinge 22, previously described is partially shown, behind the plow bar reversing mechanism, generally indicated at 120. This reversing mechanism comprises a hydraulic cylinder 122 pivotally secured to plate 124 by stub shafts 126 which are captured in a pillow block 128. The plate 124 is fixedly secured to frame crossbar 14. The piston rod 130 of the hydraulic cylinder 122 is connected by pin 132 to an upright bracket 134 which is fixedly secured to a slide plate 136 (see FIG. 5). The slide plate 136 is slidably mounted on plate 124 by cover plate 138 and side shims 140. An arm 142 is fixedly secured to the plow bar 20 and projects past the axis of the hinge pin 28 with a distal bore to receive a link pin 144. A plow bar lift link 146 is pivotally connected between the slide plate 136 and the plow bar arm 142 by link pins 144 and 132.

FIG. 5 also shows, in greater detail, the rear hinge assembly 22. The frame hinge plates 26 are fixedly secured to the opposite sides of the square tubular crossbar 14, and plow bar hinge plates 24 are received between the frame hinge plates 26.

The operation of the plow bar reversing mechanism to move the plow bar 20 from the left plow position, shown in phantom lines of FIG. 3, to the right plow position, shown in bold lines of FIG. 3 is shown in progressive stages by FIGS. 4–8. The operation is commenced from the plow bar position shown in FIG. 4 by extension of the piston rod 130 of hydraulic cylinder 122, shown by the arrowhead line in FIG. 4. The continuation of this extension shifts the slide plate 136, causing the plow bar 20 to lift from the frame 10 and move in an arc about its hinge axis which extends through the hinge pins 28 at the front and rear of the frame 10. When the plow bar 20 reaches the position shown in FIG. 6, piston rod 130 is fully extended, and the link 146 is aligned with arm 142. When this position is reached, the movement of the hydraulic cylinder is reversed, and piston rod 130 is retracted to lower the plow bar 20 into the position shown in FIG. 7. The reversal of the plow bar from its position shown in FIG. 7 is achieved by retraction of the piston rod 130, swinging the plow bar 20 in an arc about its hinge axis until it reaches the position shown in FIG. 8, with the link 146 aligned with arm 142. At this position, the movement of the hydraulic cylinder is reversed, extending piston rod 130 and lowering plow bar 20 into the position shown in FIG. 4. In this manner, the complete reversal of the plow bar through an arc of 180 degrees about its hinge axis is achieved with a single, double acting hydraulic cylinder. The plow bar 20 is self-locking in its two plowing positions, shown in FIGS. 4 and 7, since link 146 is vertical in both these positions, and any upward force on the plow bar 20 places the link 146 in compression, but cannot effect any shifting of the slide plate 136.

Referring now to FIGS. 9–12, the wheel lift assembly and the lift arm fulcrum selector will be described in greater detail. As shown in FIG. 9, the lift shaft 76 is tubular and slidably receives a concentric tube or selector tube 150. The lift shaft 76 is secured to the frame 10 by pillow blocks 78, and the rear halves 77 of these blocks are shown in FIG. 9.

The lift lever arms 88 and 90 of each lift lever 86 are shown in sectional view with the end 72 of each lift link 66 received between the lever lift arms. Also shown in cross-sectional view are the actuator arms 84 which, as previously mentioned, are pivotally secured to the end of the piston shaft 82 of the wheel lift hydraulic cylinders 80.

The fulcrum selector 94 comprises tube 150 and a coextensive angle crossbar 152 which is fixedly secured thereto by selector arms 96 and 98. Each selector arm, when the lift is in the retracted position shown in FIGS. 2 and 9, extends coextensively along the lift lever arms 88 and 90. The selector arms 96 and 98 are provided with a like plurality of apertures 154 to align with apertures 71 in the lift lever arms and apertures 70 of the lift link 66. Selector pins 91 are placed in preselected apertures 154 of the selector arms and secured therein by set screws 160 (see FIG. 10). These pins are removable and can be placed in any selected one of the plurality of apertures 154. The selector arms 96 and 98 distally support end plates 160 which have a bracket plates 162 which support another set of selector pins 164.

As previously mentioned, the fulcrum selector 94 is mounted on carriage frame 10 by means permitting its sidewise shifting, and for this purpose, tube 150 is slidably received in the tubular lift shaft 76. The selector tube 150 and dependent angle crossbar 152 are slightly greater in width than the lift shaft 76 and, as the fulcrum selector 94 is shifted, side-to-side, alternate pins 91 and 164 are retracted and inserted into aligned pairs of apertures 70 and 71, thereby providing a selection of the fulcrum between the lift lever arms and the lift link, and when the lift mechanism is extended to the position shown in FIGS. 1 and 3, variable elevations of the wheels 58. The pins, such as 91 and 164, are sufficiently long that they do not fully retract from the apertures in the lift arms of each lift lever 86. This maintains alignment of the pins in their respective apertures.

An indexing means 151 is provided to insure alignment of apertures 154 in the selector arms with apertures 71 in the lift lever arms and apertures 70 in the lift links 66. The indexing means is mounted to the frame beneath each hydraulic lift cylinder 80 and is shown in elevational view in FIG. 12. The indexing means 151 comprises an arm 153 at each side of the plow which is pivotally mounted to its respective frame bar 17 or 19. The forward end of arm 153 is shown in FIG. 12. As there illustrated, the arm 153 has a coextensive slot 155 in which is slidably received block 157. Block 157 is pivotally secured to actuator arm 84 by pin 159 (see also FIG. 9). Precise alignment of actuator arm 84 is achieved by an adjustable stop for block 157 which is formed of shaft 161 that is threadably mounted to the end plate 163 of arm 153 by nuts 165 and 167 which are permanently secured to plate 163. Advancing or retracting shaft 161 in end plate 163 provides an adjustable stop for block 157 and thus insures alignment of the apertures when the assembly is in the position shown in FIG. 2.

Preferably, the fulcrum selector 94 of the wheel lift is coupled to the plow bar 20 so that the rotation of the plow bar to reverse the plows will also effect sidewise shifting of the fulcrum selector to reverse the position of the wheels. To this end, a selector actuating means 170 is provided. The actuating means is centrally mounted on the lift shaft 76 with a cooperating toggle plate 180 which is centrally mounted on the front crossbar 12 of the carriage frame 10. A pair of toggle plates 180 (see FIG. 11) are pivotally mounted on stub shaft 182 which is dependent from plate 184 which is fixedly secured to crossbar 12. Each toggle plate 184 has a T-shape with side arms 186 which project beneath the plow bar 20. The stub shaft 182 is aligned with the hinge axis (pins 28) of the plow bar so that the plow bar 20 will engage the side arms 186 to rotate the toggle plates at each end of its arcuate movement about pins 28. Each lower end 188 of the toggle plate 180 has a slot 190 which receives stub shafts 192 that extend laterally from a carriage sleeve 194 (see FIG. 11). The carriage sleeve 194 is slidably received over lift shaft 76 and has two downwardly dependent abutment brackets 196 which are captured between abutment stops 198 and 200 which are fixedly secured to the fulcrum selector angle crossbar 152. With this mechanism, the seating of the plow bar 20 in either of its left or right plowing positions will effect a rotation of the toggle plates 180 and through carriage sleeve 194, will cause sidewise shifting of the fulcrum selector, inserting and retracting respective selector pins 91 and 164. This effects a change in the fulcrum positions of the lift levers and reverses the elevations of the wheels of the carriage. Thus, a single movement of the plow bar reverses the plows and the wheels between their furrow and land positions.

Reversal of the plow bar 20 also flips the hitch 100 from side-to-side, as needed to provide the proper lateral offset for the tow tractors. One feature of the hitch mechanism, however, is that it provides an upward movement of the front end of the plow bar which is less than the amount of permissible downward movement of this member. As previously mentioned, the hitch 100 is pivotally secured to the front end of the plow bar with a hinge pin 114. As shown in FIGS. 13 and 14, the forward end of plow bar 20 terminates with a bracket 110 which has lateral sides 112 that are bored to receive the hinge pin 114. The rear face of the offset hitch bar 104 bears a pair of hitch plates 116 which have bores to receive the hinge pin 114. The hitch bar also supports upper and lower abutment plates 212 and 214, respectively. Removable abutments stops in the form of steel rods 216 and 218 are provided in the assembly and are retained between the bracket 112 and retainer plates 220 and 222 which are fixedly attached to the box member 112. The upper abutment stop is retained in a position to engage the upper abutment plate 212 and limit the degree of pivot of the plow bar in a clockwise direction as viewed in FIG. 1. This prevents the plows from lifting out of the ground during plowing. The lower abutment stop 218, however, is supported by retainer plates 222 beneath the lower abutment plate 214 so that the plow bar 20 can flex through a greater angular movement in the counterclockwise direction as viewed in FIG. 1. This permits sufficient flexing of the hitch 100 and the plow bar 20 which is required for travelling with the plows elevated from their plowing positions, e.g., when turning around at the end of the field. When the plow bar 20 is reversed by rotation through a 180-degree arc, the positions of the abutment stops are reversed. The abutment stops are retained in the assembly by stops 224 and 226 positioned at opposite ends of the stops.

The invention has been described with reference to the illustrated and presently preferred embodiments. It is not intended that the invention be limited by the disclosure of the presently preferred embodiment. Instead, it is intended that the invention be defined by the means, and their obvious equivalents, set forth in the following claims.

What is claimed is:

1. In a carriage having at least one support wheel mounted on each of its left and right sides with wheel lift assembly means for a controlled, variable elevational position of each wheel, the improvement comprising:
   (a) a carriage frame having at least one longitudinal member and front and rear cross members;
   (b) said wheel lift assembly means comprising a main axle and a wheel lift shaft extending laterally across, and secured at spaced-apart positions to, said carriage frame;
   (c) right and left wheel forks, each with a fork knuckle on one thereof, each said fork knuckle pivotally received over an opposite end of said main axle, and said right and left wheel forks each distally supporting a wheel axle on the other end thereof;
   (d) right and left wheels comprising said at least one support wheel, one each rotatably received on its respective one of said wheel axles supported by said wheel forks;
   (e) right and left fork arms, one each fixedly secured to and projecting from its respective wheel fork;
   (f) right and left wheel lift levers pivotally mounted on said lift shaft at opposite ends thereof, and each having a first plurality of spaced-apart apertures;
   (g) right and left lift links, one each distally and pivotally attached to its respective one of said fork arms and extending to its respective one of said lift levers and having a second, like plurality of apertures at equal spaced-apart intervals to said first plurality of apertures whereby respective pairs of apertures of said first and second pluralities of apertures are aligned in at least one position of said wheel lift assembly means;
   (h) right and left removable pin means, one each inserted in a preselected, aligned pair of said apertures; and
   (i) means to rotate said lift shaft whereby said lift assembly means displaces said right and left wheels a controlled vertical distance as determined by the insertion of its respective one of said pin means in a preselected aligned pair of said apertures.

2. The carriage of claim 1 including actuator lever means fixedly secured to said wheel lift shaft and hydraulic means linked thereto to effect rotation of said wheel lift shaft.

3. The carriage of claim 1 including selector yoke means slidably mounted for sidewise shifting on said frame including left and right selector arms carried at respective ends of a selector bar, and each of said selector arms supporting at least one of said removable pin means, opposite a preselected pair of said apertures, whereby sidewise shifting of said selector yoke means inserts one of said pin means into a preselected pair of said apertures at one side and retracts another one of said pin means from a preselected pair of said apertures at the opposite side of said lift assembly means.

4. The carriage of claim 3 wherein each of said selector arms carries two of said pin means, one medially and one laterally, whereby sidewise shifting of said selector yoke means retracts one and inserts the other of said two pin means into respective preselected pairs of said apertures, thereby reversing, between the left and right sides of said lift assembly means, the preselected pair of said apertures and causing the reversal of the vertical position of said left and right wheels.

5. The carriage of claim 1 including a longitudinal plow bar mounted on said frame, with a pair of plow assemblies mounted thereon, at 180 degrees thereto.

6. The carriage of claim 5 wherein said plow bar is pivotably mounted on said frame on an axis of rotation above said frame by hinge means secured to said carriage frame, and including means to rotate said plow bar on said carriage frame through an arc of 180 degrees to position either of said plow assemblies in a plowing position between said wheels.

7. The carriage of claim 6 wherein said plow bar includes a forward end and a rear end and said plow assemblies are mounted at the rear end of said plow bar.

8. The carriage of claim 7 including hitch means secured to the forward end of said plow bar.

9. The carriage means of claim 8 wherein said hitch means includes a hitch bar with a pivotal attachment with means at its rear end for pivotal attachment to the forward end of said plow bar and pivotal stop means limiting the pivotal movement of said hitch bar relative to said plow bar.

10. The carriage means of claim 9 wherein said pivotal stop means permits pivoting of said hitch bar through an upward arc greater than it permits pivoting of said hitch bar through a downward arc.

11. The carriage means of claim 10 wherein said stop means comprises an abutment plate carried on the forward end of said plow bar, top and bottom abutment brackets mounted on the rear end of said hitch bar in opposed alignment to said abutment plate, and abutment means removably captured between said plate and said top abutment bracket.

12. The carriage means of claim 11 wherein said abutment means includes an upper and a lower abutment shim, and including an abutment shim storage tray carried by said abutment plate beneath said abutment brackets to support said lower abutment shim out of engagement by said lower abutment bracket.

13. The carriage means of claim 12 including an abutment shim ledge to support said upper abutment shim between said upper abutment bracket and said abutment plate.

14. The carriage means of claim 6 including selector yoke means slidably mounted for sidewise shifting on said frame including left and right selector arms carried at respective ends of a selector bar, and each of said selector arms supporting at least one of said removable pin means, opposite a preselected pair of said apertures, whereby sidewise shifting of said selector yoke means inserts one of said pin means into a preselected pair of said apertures at one side and retracts another one of said pin means from a preselected pair of said apertures at the opposite side of said lift assembly means.

15. The carriage means of claim 14 including mechanical link means between said plow bar and said selector yoke means, whereby rotation of said plow bar effects sidewise shifting of said selector yoke means and causes reversal of the vertical positions of said left and right wheels.

16. The carriage of claim 15 wherein said mechanical link means includes spaced-apart abutment stops centrally carried by said selector bar, a lift lever carriage slidably received on said lift shaft with foot means engaged between said abutment stops, a toggle plate pivotally mounted on said frame with opposite lateral arms projecting beneath said plow bar for engagment by said plow bar at each end of its arc of 180 degrees, and a toggle yoke dependent from said toggle plate which extends into a pinned interconnection to said lift lever carriage whereby sidewise shifting of said lift lever carriage effects sidewise shifting of said selector yoke means.

17. The carriage of claim 5 including means to rotate said plow bar through an arc of 180 degrees.

18. The carriage means of claim 17 wherein said means to rotate said plow bar includes a hydraulic cylinder, lever bracket means carried by said plow bar and link means mounted between said bracket means and said hydraulic cylinder.

19. The carriage means of claim 18 whereby one end of said link means is pivotally mounted on a slide plate having two ends, of which one end is carried on said frame for sidewise shifting by said hydraulic cylinder and the other end of said two ends is pivotally secured to said lever bracket means carried by said plow bar.

20. The carriage means of claim 19 whereby the said hydraulic cylinder is a double-acting cylinder with reversal means to reverse the extension of the cylinder during a complete rotation of the plow bar through its 180-degree arc about its axis.

* * * * *